US012695640B1

(12) United States Patent
Levy et al.

(10) Patent No.: US 12,695,640 B1
(45) Date of Patent: Jul. 28, 2026

(54) DYNAMIC SOFTWARE ARCHITECTURE RECONFIGURATION FOR CONVERGED CABLE ACCESS PLATFORM (CCAP)

(71) Applicant: Harmonic, Inc., San Jose, CA (US)

(72) Inventors: Adam Levy, Givaat Olga (IL); Andrey Ter-Zakgariants, San Jose, CA (US); Anna Kopelnik, San Jose, CA (US); Nitin Kumar, San Ramon, CA (US)

(73) Assignee: Harmonic, Inc., San Jose, CA (US)

( * ) Notice: Subject to any disclaimer, the term of this patent is extended or adjusted under 35 U.S.C. 154(b) by 1271 days.

(21) Appl. No.: 16/266,621

(22) Filed: Feb. 4, 2019

Related U.S. Application Data

(60) Provisional application No. 62/626,578, filed on Feb. 5, 2018.

(51) Int. Cl.
H04N 7/173 (2011.01)
H04L 12/28 (2006.01)
(Continued)

(52) U.S. Cl.
CPC .......... H04L 12/2801 (2013.01); H04L 45/66 (2013.01); H04N 21/6118 (2013.01); H04N 21/6168 (2013.01)

(58) Field of Classification Search
CPC .......... H04N 21/6168; H04N 21/6118; H04N 21/6175; H04N 21/42676; H04N 21/235; H04N 21/435; H04N 21/4622; H04N 21/4782; H04N 21/8586; H04N 21/4331; H04N 21/47202; H04L 12/2801; H04L 45/66
See application file for complete search history.

(56) References Cited

U.S. PATENT DOCUMENTS 7,657,915 B1 * 2/2010 Bradley .............. H04L 12/2861
725/111
8,170,065 B2 * 5/2012 Hasek .............. H04N 21/25825
370/486
(Continued)

OTHER PUBLICATIONS

Thomas, Shane, "Written Opinion of the International Searching Authority of International Application No. PCT/US19/16539," mailed Apr. 23, 2019.

*Primary Examiner* — Annan Q Shang
(74) *Attorney, Agent, or Firm* — Brokaw Patent Law, PC; Christopher J. Brokaw

(57) ABSTRACT

Approaches for Converged Cable Access Platform (CCAP) processing. A software-based CCAP environment is executed on one or more physical machines. The software-based CCAP environment is maintained by a plurality of functional blocks that are each implemented in software and perform a specific function supporting the software-based CCAP environment. Each of the plurality of functional blocks performs their specific function asynchronously from each other. A configuration is maintained for the software-based CCAP environment which informs each of the plurality of functional blocks discretely for one or more Data Over Cable Service Interface Specification (DOCSIS) service groups. The configuration may treat one or more Data Over Cable Service Interface Specification (DOCSIS) service groups as a logical unit with respect to their association with each functional block.

24 Claims, 6 Drawing Sheets

(51) Int. Cl.
     *H04L 45/00*     (2022.01)
     *H04N 21/61*     (2011.01)

(56)                References Cited

U.S. PATENT DOCUMENTS

| | | | |
|---|---|---|---|
| 8,447,851 | B1 | 5/2013 | Anderson |
| 8,839,317 | B1 * | 9/2014 | Rieger ................. H04J 3/1682 709/224 |
| 9,866,438 | B2 | 1/2018 | Ling et al. |
| 2004/0008683 | A1 * | 1/2004 | Cloonan ............ H04L 12/2801 370/395.4 |
| 2004/0107445 | A1 * | 6/2004 | Amit ................. H04N 21/6118 725/127 |
| 2005/0265397 | A1 * | 12/2005 | Chapman ........... H04L 12/2801 370/352 |
| 2009/0249421 | A1 * | 10/2009 | Liu ........................ H04L 47/41 725/116 |
| 2010/0226390 | A1 * | 9/2010 | Yan ...................... H04L 47/805 370/468 |
| 2010/0317387 | A1 * | 12/2010 | O'Keeffe ........... H04N 21/6168 455/507 |
| 2012/0147751 | A1 * | 6/2012 | Ulm .................... H04L 65/4076 370/237 |
| 2013/0174186 | A1 * | 7/2013 | Kelsen ............... H04L 12/1485 725/2 |
| 2013/0179933 | A1 * | 7/2013 | Lee .................. H04N 21/64322 725/116 |
| 2013/0294462 | A1 * | 11/2013 | Chang ................ H04L 12/2801 370/497 |
| 2014/0282729 | A1 * | 9/2014 | Stern .................. H04N 21/8133 725/40 |
| 2015/0295669 | A1 * | 10/2015 | Chapman ............. H04L 27/345 370/503 |
| 2016/0066021 | A1 * | 3/2016 | Thomas ................. H04L 67/22 725/14 |
| 2016/0205435 | A1 * | 7/2016 | Stafford ................. H04L 41/12 725/127 |
| 2017/0163486 | A1 * | 6/2017 | Ling .................. H04L 27/2601 |
| 2017/0329791 | A1 * | 11/2017 | Manchester .......... H04N 21/84 |
| 2018/0014081 | A1 * | 1/2018 | Levy ................. H04N 21/6118 |
| 2018/0063559 | A1 * | 3/2018 | Kim .................... H04N 21/472 |
| 2018/0234196 | A1 * | 8/2018 | Klopfenstein ..... H04N 21/2385 |
| 2020/0092615 | A1 * | 3/2020 | Zhang ............. H04N 21/64738 |

* cited by examiner

50

EXECUTE A SOFTWARE-BASED CCAP ENVIRONMENT, MAINTAINS BY A PLURALITY OF FUNCTIONAL BLOCKS, ON ONE OR MORE PHYSICAL MACHINES

60

MAINTAIN A CONFIGURATION FOR THE SOFTWARE-BASED CCAP ENVIRONMENT WHICH INFORMS EACH OF THE PLURALITY OF FUNCTIONAL BLOCKS DISCRETELY ABOUT ONE OR MORE DATA OVER CABLE SERVICE INTERFACE SPECIFICATION (DOCSIS) SERVICE GROUPS

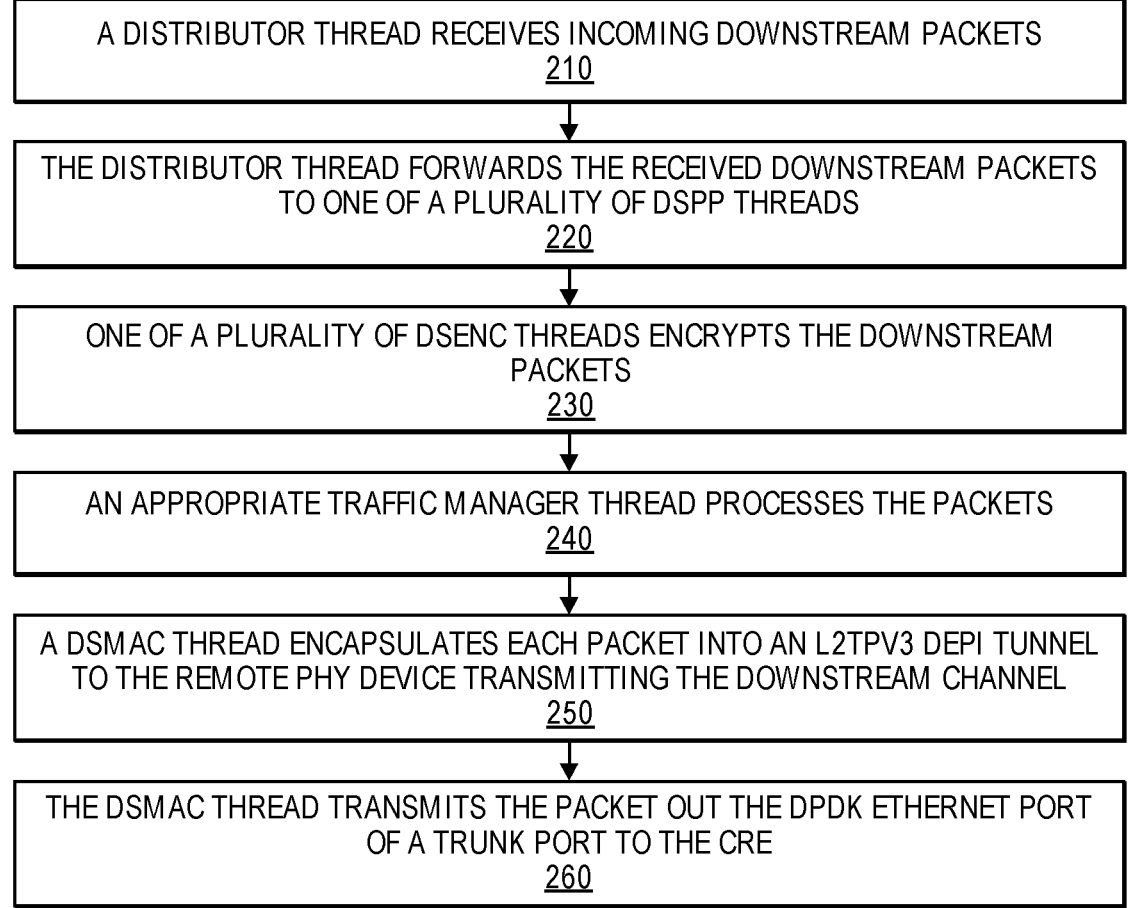

A DISTRIBUTOR THREAD RECEIVES INCOMING DOWNSTREAM PACKETS
210

THE DISTRIBUTOR THREAD FORWARDS THE RECEIVED DOWNSTREAM PACKETS
TO ONE OF A PLURALITY OF DSPP THREADS
220

ONE OF A PLURALITY OF DSENC THREADS ENCRYPTS THE DOWNSTREAM
PACKETS
230

AN APPROPRIATE TRAFFIC MANAGER THREAD PROCESSES THE PACKETS
240

A DSMAC THREAD ENCAPSULATES EACH PACKET INTO AN L2TPV3 DEPI TUNNEL
TO THE REMOTE PHY DEVICE TRANSMITTING THE DOWNSTREAM CHANNEL
250

THE DSMAC THREAD TRANSMITS THE PACKET OUT THE DPDK ETHERNET PORT
OF A TRUNK PORT TO THE CRE
260

FIG. 2B

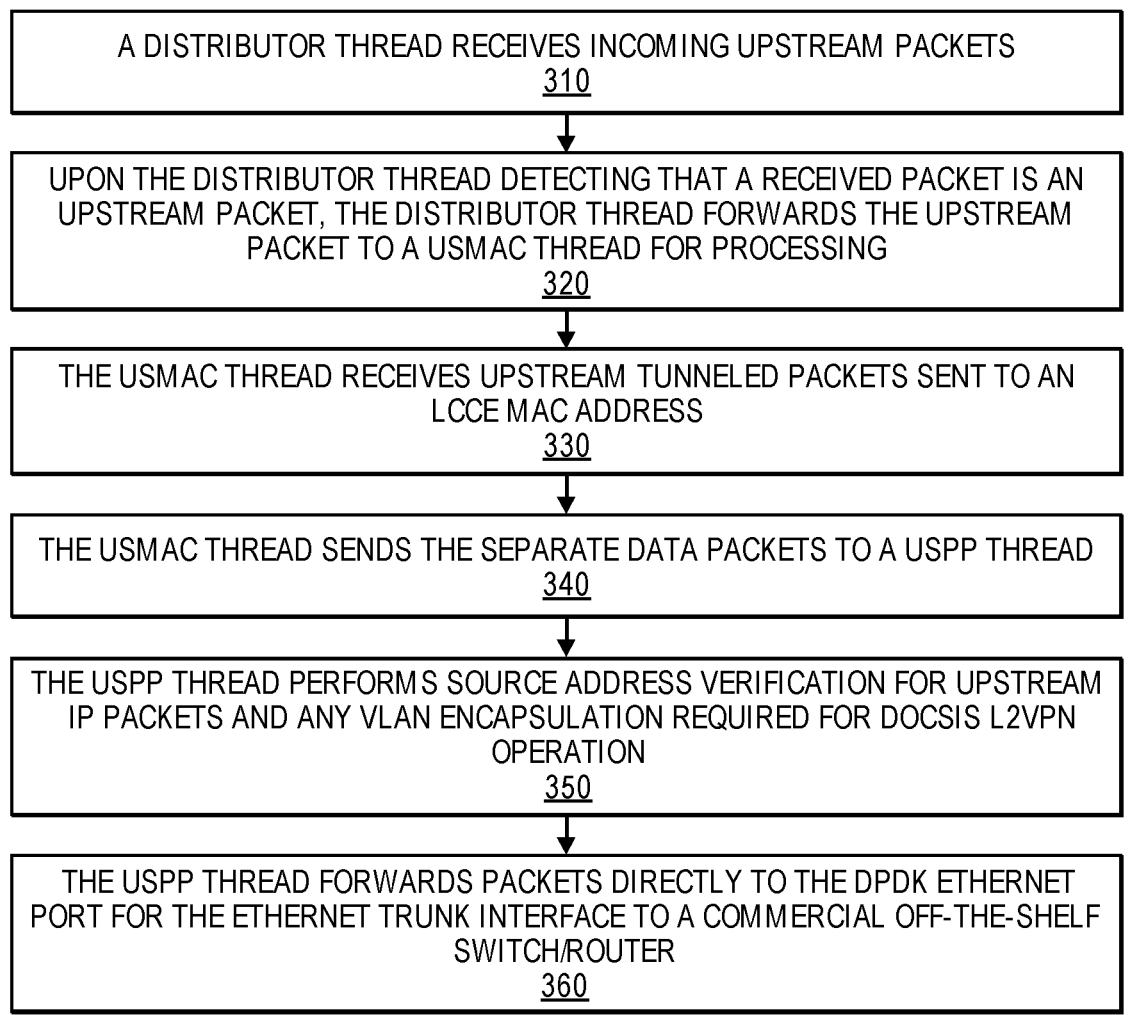

A DISTRIBUTOR THREAD RECEIVES INCOMING UPSTREAM PACKETS
310

UPON THE DISTRIBUTOR THREAD DETECTING THAT A RECEIVED PACKET IS AN UPSTREAM PACKET, THE DISTRIBUTOR THREAD FORWARDS THE UPSTREAM PACKET TO A USMAC THREAD FOR PROCESSING
320

THE USMAC THREAD RECEIVES UPSTREAM TUNNELED PACKETS SENT TO AN LCCE MAC ADDRESS
330

THE USMAC THREAD SENDS THE SEPARATE DATA PACKETS TO A USPP THREAD
340

THE USPP THREAD PERFORMS SOURCE ADDRESS VERIFICATION FOR UPSTREAM IP PACKETS AND ANY VLAN ENCAPSULATION REQUIRED FOR DOCSIS L2VPN OPERATION
350

THE USPP THREAD FORWARDS PACKETS DIRECTLY TO THE DPDK ETHERNET PORT FOR THE ETHERNET TRUNK INTERFACE TO A COMMERCIAL OFF-THE-SHELF SWITCH/ROUTER
360

FIG. 3

DYNAMIC SOFTWARE ARCHITECTURE RECONFIGURATION FOR CONVERGED CABLE ACCESS PLATFORM (CCAP)

CLAIM OF PRIORITY

This application claims priority to U.S. Provisional Patent Application No. 62/626,578, entitled "Dynamic Software Architecture for Video Processing," by Nitin Sasi Kumar, filed on Feb. 5, 2018, the entire disclosure of which is hereby incorporated by reference for all purposes as if fully set forth herein.

FIELD OF THE INVENTION

Embodiments of the invention generally relate to a software-based Converged Cable Access Platform (CCAP).

BACKGROUND

A Converged Cable Access Platform (CCAP) is a Cable-Labs-led effort that brings technical and operational unity to two projects: The Converged Multiservice Access Platform (CMAP), headed up by Comcast Corp, and Converged Edge Services Access Router (CESAR), headed up by Time Warner Cable Inc.

Data Over Cable Service Interface Specification (DOCSIS) is a telecommunications standard used to provide Internet access via a cable modem.

Currently, industry practice is to implement CCAP functionality in special purpose hardware such as Ternary Content-Addressable Memory (TCAMs) for classification and Field-Programmable Gate Arrays (FPGAs) for packet scheduling and replication.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 2B is a flowchart illustrating the functional steps of DOCSIS downstream forwarding in accordance with an embodiment of the invention;

FIG. 3 is a flowchart illustrating the functional steps of DOCSIS upstream forwarding in accordance with an embodiment of the invention.

DETAILED DESCRIPTION OF THE INVENTION

Approaches for software-based Converged Cable Access Platform (CCAP) employing a plurality of functional blocks are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

A software-based Converged Cable Access Platform (CCAP) is software that performs the functions of a hardware-based CCAP. The software-based CCAP may execute on hardware components that include a commercial off-the-shelf switch/router and one or more off-the-shelf computing servers. A commercial example of a software-based CCAP is CableOS, available from Harmonic, Inc. of San Jose, California.

Embodiments of the invention are directed towards a software-based CCAP environment that employs functional blocks implemented entirely by software. In an embodiment, the functions of a software-based CCAP environment are performed by a plurality of functional blocks. Each of the functional blocks may focus on a specific function. Thus, each functional block is a self-contained unit of functionality.

Figure 1A:
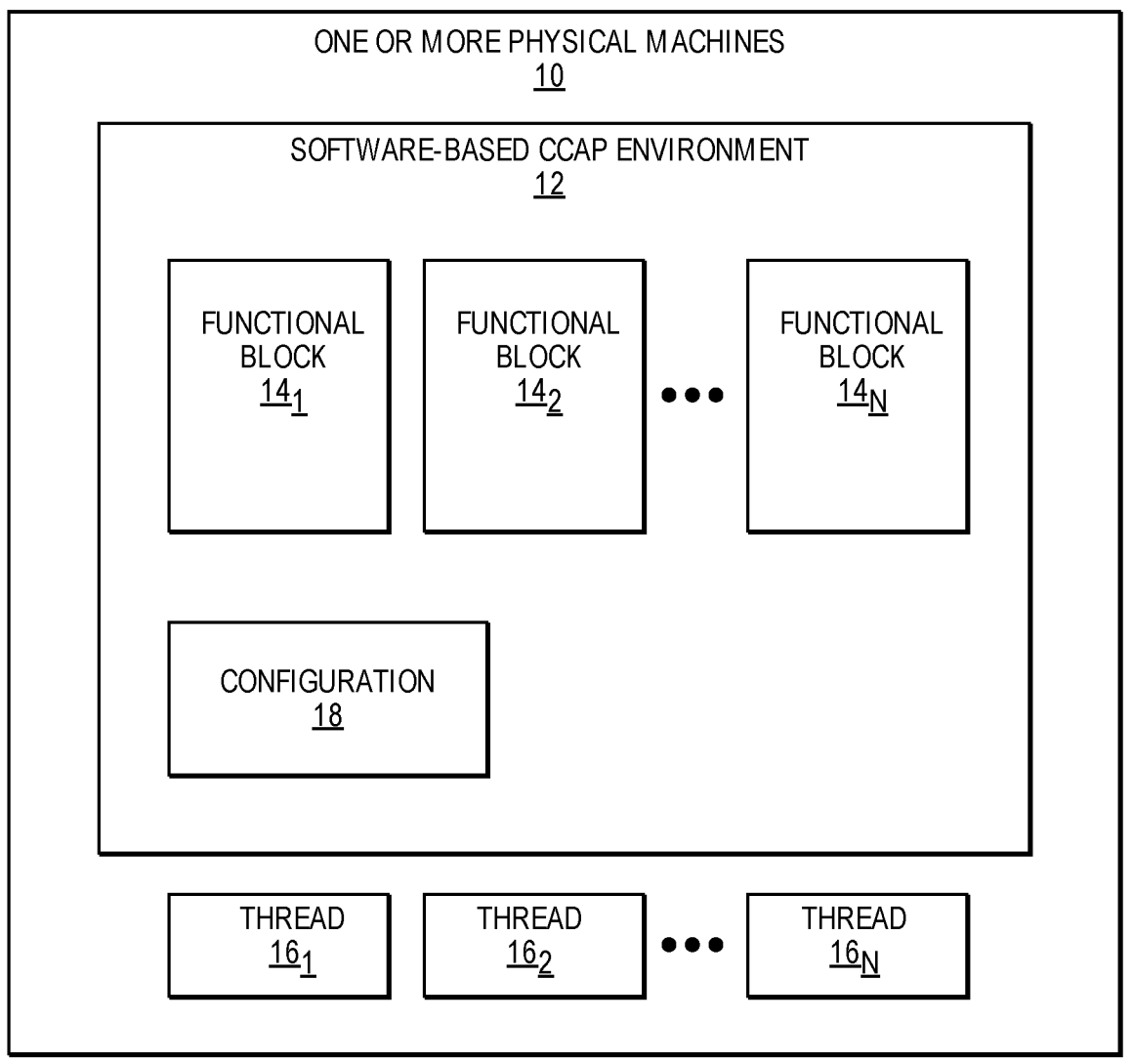
FIG. 1A is a block diagram of a software-based Converged Cable Access Platform (CCAP) in accordance with an embodiment of the invention.

FIG. 1A is a block diagram of a software-based Converged Cable Access Platform (CCAP) in accordance with an embodiment of the invention. As shown in FIG. 1A, a software-based CCAP environment 12 may execute upon one or more physical machines 10. Each of physical machines 10 may be implemented using a commercial off-the-shelf switch/router and one or more off-the-shelf computing servers. The operation of an individual physical machine 10 will be described in greater detail below with reference to FIG. 4.

Figure 1B:
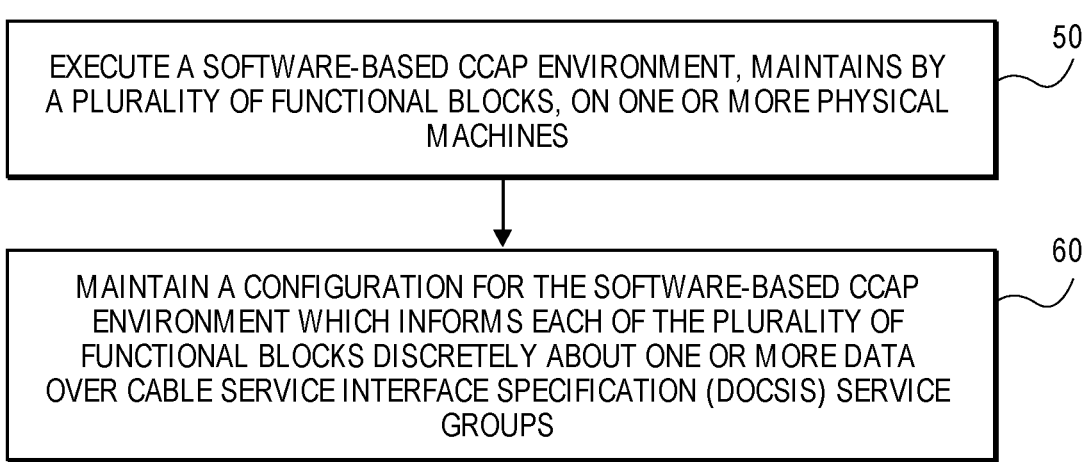
FIG. 1B is a flowchart illustrating the functional steps of performing Converged Cable Access Platform (CCAP) processing according to an embodiment of the invention.

FIG. 1B is a flowchart illustrating the functional steps of performing Converged Cable Access Platform (CCAP) processing according to an embodiment of the invention. In step 50, software-based CCAP environment 12 is executed upon one or more physical machines 10. Software-based CCAP environment 12 may be maintained by a plurality of functional blocks 14. As depicted by the subscript notation of functional blocks 14 in FIG. 1A, the plurality of functional blocks 14 may correspond to any number of functional blocks in the plurality of functional blocks 14.

Each functional block 14 processes a set of input and produces a set of output. The set of input to an individual functional block 14 may correspond to events, signal, and/or messages generated either as output of other functional blocks 14 or generated externally. The set of output of a functional block 14 may be consumed as input by one or more other functional blocks 14. For example, the output of functional block $14_1$ may be consumed as input by functional block $14_2$. Each of the plurality of functional blocks 14 may execute within its own separate container, such as but not limited to a virtual machine.

A functional block 14 may target its output to one or more other specific functional blocks 14. Also, the set of output generated by a single functional block 14 may include one or more outputs.

Certain types of functional blocks 14 (termed herein a 'mediator functional block' or a 'distributor functional block') may analyze a set of output and decide which functional block 14 should process/receive that set of output. In other words, a mediator functional block 14 may cause the set of output produced by a first functional block 14 to be directed towards, and thus subsequently consumed by a second functional block 14 as input.

Functional blocks 14 may execute synchronously, asynchronously, and/or in parallel with one another. A functional block 14 of an embodiment can execute whenever the functional block 14 has a set of input to process. An execution runtime may schedule a functional block to execute on a single thread 16, on multiple threads 16 in a single process, on multiple processing, on multiple compute nodes, or any combination thereof. The execution of a particular functional block 14 may be adjusted to switch from one or more of (a) executing upon a single thread 16 to upon multiple threads 16, (b) executing upon multiple threads 16 to a single thread 16, (c) executing upon multiple compute nodes of one or more physical machines 10 to a single compute node of one or more physical machines 10, and (d) executing upon a single compute node of one or more physical machines 10 to multiple compute nodes of one or more physical machines 10.

Returning to FIG. 1B, step 60 of FIG. 1B indicates that one or more configuration files 18 for software-based CCAP environment 12 is maintained. One or more configuration files 18 inform each of the plurality of functional block discretely on how to operate. For example, one or more configuration files 18 inform each of the plurality of functional block discretely about how to operate with respect to one or more Data Over Cable Service Interface Specification (DOCSIS) service groups (SGs). In an embodiment, one or more (DOCSIS) service groups (SGs) may be treated as a logical unit by one or more configuration files 18 with respect to their association with functional blocks 14. For example, a set of DOCSIS service groups (this will likely be only a subset of the total number of DOSCIS service groups) may be associated together so that they are treated as a single unit, thereby preventing them to be assigned in a different manner.

Embodiments may instruct a functional block 14 to perform work for a single Data Over Cable Service Interface Specification (DOCSIS) service group or for multiple Data Over Cable Service Interface Specification (DOCSIS) service groups. To illustrate, in an embodiment, a first functional block 14 may be instructed to perform work for a single Data Over Cable Service Interface Specification (DOCSIS) service group while a second functional block 14 is instructed to perform work for multiple DOCSIS service groups.

The implementation of the execution runtime of software-based CCAP environment 12 may be carried out using library APIs. The operation of the execution runtime may be controlled using one or more configuration files 18 that specify how certain functions are to be performed. Note that the software logic implemented by each functional block 14 need not be aware of how and where it is scheduled to execute.

Certain embodiments may use functional blocks 14 as described herein to implement the DOCSIS protocol, although embodiments may employ functional blocks 14 to perform any functionality traditionally performed by a CCAP device.

In an embodiment, a functional block 14 may be implemented by a threadable object. A non-limiting, illustrative example of a threadable object is a C++ class instance. To illustrate, a separate threadable object may perform functionality to support the DOCSIS protocol, such as for example Modem Ranging and Modem Registration. A group of threadable object may execute on a single thread, such as thread 16₁. A single threadable object may execute upon multiple threads, such as threads 16₁-16₃. A threadable object may be oblivious to the threading model used by software-based CCAP environment 12 at runtime, and its operation may be configured using one or more configuration files 18 read by each threadable object.

In the prior art, traditional Cable Modem Termination System (CMTS) software was architected for specific use cases. Such specially tailored software was executed upon expensive hardware even for light loads. Further, prior art CMTS software was a monolithic architecture that did not scale individual functions in accordance with need.

In contrast to the prior art, plurality of functional blocks 14 enable embodiments to dynamically adapt to the changing needs of the present. For example, software-based CCAP environment 12 may adopt a single threaded model a low amount of resources of one or more physical machines 10 are available; such low levels of available resources may be dynamically determined as being below a certain threshold. Alternately, a multi-threaded model may be used by software-based CCAP environment 12 when a high load/large number of resources are available. As another option, software-based CCAP environment 12 of an embodiment may employ a mixture of models for adapting individual functions to the presently experienced load. Advantageously, no software redesign is required by embodiments for software-based CCAP environment 12 to support virtually any CMTS use case.

When compute resources available to software-based CCAP environment 12 are limited, two or more threadable object may share a single thread 16. To scale based on load, threadable objects may execute on separate threads 16. In an embodiment, the mapping of threadable objects to threads 16 may be based on a static configuration, e.g., based on the expected load patterns, specified by one or more configuration files 18. In other embodiments, the mapping of threadable objects to threads may be dynamically determined at runtime, e.g., based on the observed load patterns and availability of compute resources, as specified by one or more configuration files 18.

In an embodiment with limited CPU resources and light load, all threadable objects may be executed upon a single thread 16. In embodiments having a high load and available compute resources, threadable objects may be executed upon separate threads 16 and/or each thread 16 may run on a separate CPU core to handle a high load.

Embodiments may perform mapping between functional blocks 14 and threads 16 based on observed load patterns. For example, there may be high load on certain functions (such as Modem Ranging) but low loads on other functions. As a result, embodiments may respond by executing the functional block 14 responsible for Modem Ranging on a separate thread 16 but all other functional blocks 14 on a shared thread 16. Advantageously, the mapping between functional blocks 14 and threads 16 may dynamically change based on observed load.

Embodiments of the invention may adjust the mapping between functional blocks 14 and threads 16 based on manual configuration or in an autonomous fashion based on observed load and available resources of one or more physical machines 10. Automatic adjustment of the mapping between functional blocks 14 and threads 16 may be performed in accordance with a pre-programmed or established model by some embodiments. For example, manual configuration may be fed to a learning function that refines the pre-programmed model over time.

As previously mentioned, a functional block 14 may execute a set of input to generate a set of output. A set of input may correspond to a certain amount of packets so that a functional block 14 performs a certain amount of processing on a set of packets. The set of output produced by a functional block 14 may correspond to a certain amount of packets that are ready for a next stage of processing. Thus, as the set of output produced by a functional block may be routed as a set of input to a different functional block 14, functional blocks 14 may operate in a pipeline or a set of stages. The stages discussed hereafter may each be implemented by one or more functional blocks 14.

A stage implemented by one or more functional blocks 14 may be assigned a set of resources to optimize its execution given the greater context (such as but not limited to the amount of total available resources, the other consumers of those resources, and the workload performed by the stage) in which a stage is deployed.

Zero Locking Rings

Embodiments of the invention may employ functional blocks to divide the functions of DOCSIS downstream MAC Layer forwarding among multiple software cores of a commercial off-the-shelf switch/router (terms a 'Core Routing Engine component' or CRE in certain embodiments) of a virtual CCAP. Certain embodiments make use of the Data Path Development Kit (DPDK), which features zero-locking rings between cores. Such zero-locking rings contain pointers to shared DPDK Message Buffers or "MBUFs". Each MBUF comprises a header that contains DPDK MBUF library information as well a structure between the end of the MBUF header and the start of packet data called the MBUF "headroom." Embodiments call for storing information useful for DOCSIS forwarding in the MBUF headroom.

Embodiments of the invention may use DPDK "Single Producer Single Consumer" rings to avoid thread synchronization between multiple producers or multiple consumers. Each thread repeatedly checks for the availability of any packets on each of the rings it receives.

Figure 2A:
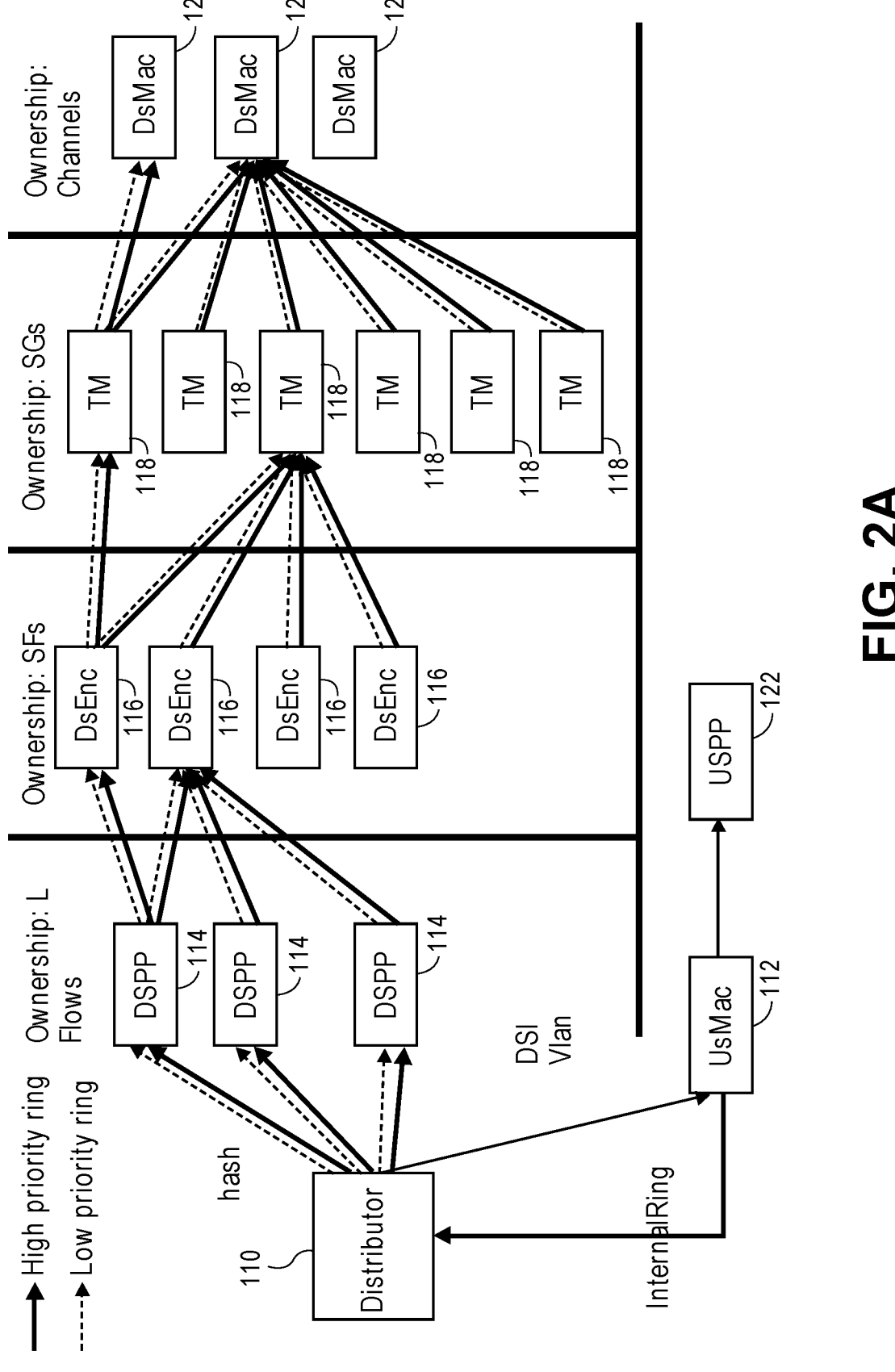
FIG. 2A is an illustration of DOCSIS downstream and upstream forwarding in accordance with an embodiment of the invention.

FIG. 2A is an illustration of DOCSIS downstream forwarding in accordance with an embodiment of the invention. Distributor thread 110 of FIG. 2A is a thread which is responsible for receiving all incoming physical packets from the trunk Ethernet port connected to a commercial off-the-shelf switch/router (which in an embodiment may correspond to a Core Routing Engine (CRE)). The incoming physical packets received by distributor thread 110 include downstream packets carried by the Internet as well as upstream packets tunneled from a Remote Phy Device (RPD).

While embodiments of the invention may chiefly be described in terms of distributor thread 110 being implemented by software, note that other embodiments of the invention may perform the functions of distributor thread 110 in hardware. For example, certain embodiments may employ a network card (NIC) which performs the functions attributed to distributor thread 110. Such an embodiment may include a distributor component, which is a hardware device, such as but not limited to a NIC, which is configured to perform the functions attributed to distributor thread 110 as discussed herein. Other embodiments of the invention may employ a distributor component which performs the functions attributed to distributor thread 110 as discussed herein partially in a hardware component and partially in software.

Upstream packets may be encapsulated in the L2TPv3 protocol and are addressed to an L2TPv3 Logical Control Connection Entity (LCCE) that is implemented on commercial off-the-shelf switch/router (e.g., a Core Router Engine (CRE) in an embodiment). An embodiment of this invention assigns a locally administered MAC address to the LCCE of the form 02:xx:xx:xx:xx:xx so that distributor thread 110 can rapidly detect a tunneled L2TPv3 packet and forward that packet to UsMac thread 112 which performs upstream processing. Distributor thread 110 forwards all other received packets to one of a plurality of DSPP threads 114, which are threads that are responsible for downstream processing. To do so, distributor thread 110 may hash the source and destination MAC and/or IP addresses to balance load among the DSPP threads 114.

Execution Environments

Prior to discussing the operation of downstream and upstream data flows, it will be helpful to appreciate the relationship between operational stages depicted by FIG. 2A and logical cores. The operational stages shown in FIG. 2A correspond to the distributor stage (corresponding to the distributor component), the "Downstream Packet Processor" (DSPP) stage (corresponding to the plurality of DSPP threads 114), the "Downstream Encryption" (DsEnc) stage (corresponding to the plurality of DsEnc threads 116), the "Traffic Manager" (TM) stage (corresponding to the plurality of TM threads 118), the "Downstream Medium Access Control" (DsMac) stage (corresponding to the plurality of DsMac threads 120), the "Upstream Medium Access Control" (UsMac) stage (corresponding to UsMac thread 112), and the "Upstream Packet Processor" (USPP) stage (correspond to UsMac component). The functional components within each of these stages shall be discussed in greater detail below. As used herein, a logical core includes a physical CPU core, such as Intel®'s Hyper-Threading Technology, or a virtual CPU core.

In certain embodiments of the invention, each operational stage depicted in FIG. 2A may execute on separate logical cores. In other embodiments of the invention, two or more operational stages depicted in FIG. 2A may execute on a single logical core.

In yet other embodiments of the invention, all operational stages depicted in FIG. 2A may execute on a single logical core, with either manually-scheduled (e.g. round-robin) or time-sliced concurrent scheduling of the stages on the single core. Further embodiments of the invention may allow for a user to configure which logical core should execute each operational stage without limitation such that the user can configure a single logical core to execute all operational stages or a plurality of logical cores to each execute a different operational stage, for example.

Downstream Data Flows

FIG. 2B is a flowchart illustrating the functional steps of DOCSIS downstream forwarding in accordance with an embodiment of the invention. The steps of FIG. 2B shall be explained below with reference to FIG. 1A.

In step 210, distributor thread 110 receives incoming downstream physical packets, e.g., packets carried by the Internet.

Thereafter, in step 220, distributor thread 110 forwards the received downstream packets to one of a plurality of DSPP threads 114. A DSPP thread 114 is responsible for classifying a downstream packet to a DOCSIS service flow. All DSPP threads 114 have access to the same database of downstream classifiers. A DSPP thread 114 classifies a packet using an internal index called the Traffic Manager Flow Index or TmFlowIndex. All DSPP threads 114 and all TM threads 118 use the same TmFlowIndex A DSPP thread 114 stores the TmFlowIndex to which it classified the packet into MBUF headroom field.

In DOCSIS, every downstream service flow belongs to a single DOCSIS "MAC-Domain", which is identified by embodiments of the invention by a MAC Domain ID. DSPP thread 114 also stores the MAC Domain ID of a packet's service flow in the MBUF headroom. DOCSIS also defines the concept of a "MAC-Domain downstream service group" (MD-DSSG) which comprises the set of downstream channels in a MAC-Domain that reach a single CM. DSPP thread 114 of an embodiment places into an MBUF headroom a system-unique identifier of the MD-DSSG which contains the packet's service flow. The MAC-Domain ID or MD-DSSG identifier are used to select to which TM thread DSENC forwards a downstream packet it receives from DSPP thread 114.

In step 230, one of a plurality of DsEnc threads 116 encrypts the downstream packets. To do so, a particular DsEnc thread 116 may encrypt a downstream packet by using a shared hardware component such as the Intel® QuickAssist module. Multiple DsEnc threads 116 may share only one or two hardware modules, e.g. one or two per commercial off-the-shelf switch/router (which may be termed a 'Core Server' or CS in an embodiment). Accordingly, the queueing delay to the shared encrypting mechanism may be variable. In order to reduce the variability in delay of outgoing packets after an aggregate rate limiting function of the Traffic Manager, encryption by DsEnc thread 116 is performed before Traffic Management scheduling. Embodiments of the invention advantageously perform encryption before the scheduling of packets. Current industry CMTS implementations schedule packets and then perform encryption afterwards in commercial DOCSIS chips, such as but not limited to Broadcom Corporation's BCM3215 chip, which performs the downstream Media Access Control (MAC) functions.

In order to reduce the incidence of cache misses in DsEnc threads 116, each DOCSIS service flow is assigned to a single DsEnc thread 116. Thus, the keying information and statistics for a service flow are kept in only one Dspp core L1 cache. The corresponding DSPP-to-DsEnc ring for each Dspp thread 114 is communicated to a Dspp thread 114 when a service flow is added.

In an embodiment, the functionality described above with respect to the plurality of DsEnc threads may be implemented, at least partially, in hardware rather than exclusively by software. In such an embodiment, the functionality described herein as being attributed to or performed by plurality of DsEnc threads 116 may be performed by one or more DsEnc hardware components, which may correspond to a hardware card that accelerates the operations of encrypting downstream packets. As used herein, the term 'DsEnc component' includes both a software implementation, a hardware implementation, and an implementation involving both hardware and software. While embodiments shall chiefly be described in terms of DsEnc threads 116 being implemented in software, it shall be understood to those in the art that other embodiments may be employed where DsEnc threads 116 are implemented partially or wholly by hardware.

Thereafter, in step 240, an appropriate TM thread 118 processes the packet. Each DOCSIS MAC Domain is assigned to a single Traffic Manager (TM) thread 118. A TM thread 118 enqueues packets on a per-flow queue and schedules packets for transmission using a multiple-level hierarchical packet scheduler. Each Service Flow (SF), and hence each TmFlowIndex, belongs to a single MAC Domain. When the control plane adds a new TmFlowIndex to a DsEnc thread 116, the control plane also provides a pointer to the proper DsEnc-to-TM ring to reach the TM thread 118 assigned to the service flows MAC Domain.

Embodiments of the invention call for the assignment of MAC Domains to a TM thread 118. This is because most MAC Domains consist of highly overlapping Downstream Channel Sets (DCS) with shared downstream channels. Keeping all scheduling of DCSs that share the same channel in the same channel set avoids inter-core concurrent access to memory data structures. A TM thread 118 schedules each packet to a particular downstream RF channel.

If a MAC Domain is composed of disjoint (i.e. non-overlapping) downstream service groups (SGs), then embodiments may assign the disjoint sets of SGs to different TM threads 118 and still avoid inter-core co-ordination of per-packet scheduling information.

In step 250, a DsMac thread 120 encapsulates a packet into an L2TPv3 DEPI tunnel to the Remote Phy Device (RPD) transmitting the downstream channel. Each downstream channel is assigned to a single DsMac thread 120. A single DsMac thread 120 may be used for each channel to maintain single-core operation of per-packet sequence numbers. Such per-packet sequence numbers include an MPEG sequence number or a Packet Streaming Protocol (PSP) sequence number.

After encapsulating a packet, in step 260, the DsMac thread 120 transmits the packet out the DPDK Ethernet port of a trunk port to the CRE.

Advantageously, distributor thread 110, the plurality of DSPP threads 114, the plurality of DsEnc threads 116, the plurality of TM threads 118, and the plurality of DsMac threads 120 all share the same multi-core CPU and the same hardware bus of chip signals from CPU to memory.

Upstream Data Flows

FIG. 3 is a flowchart illustrating the functional steps of DOCSIS upstream forwarding in accordance with an embodiment of the invention. The steps of FIG. 3 shall be explained below with reference to FIG. 1A.

In step 310, distributor thread 110 receives incoming upstream packets, e.g., packets tunneled from a Remote Phy Device (RPD).

In step 320, upon distributor thread 110 detecting that a received packet is an upstream packet, distributor thread 110 forwards the upstream packet to UsMac thread 112 for processing. Upstream packets may be encapsulated in the L2TPv3 protocol and are addressed to an L2TPv3 Logical Control Connection Entity (LCCE) that is implemented on commercial off-the-shelf switch/router (e.g., a Core Routing Engine (CRE) in an embodiment). An embodiment of this invention assigns a locally administered MAC address to the LCCE of the form 02:xx:xx:xx:xx:xx so that distributor thread 110 can rapidly detect a tunneled L2TPv3 packet and forward that packet to UsMac thread 112 which performs upstream processing.

In step 330, UsMac thread 112 receives upstream tunneled packets sent to an LCCE MAC Address. UsMac thread 112 reassembles the sequences of upstream bursts from each upstream channel and separates the bursts into separate upstream packets, each in their own MBUF.

Thereafter, in step 340, UsMac thread 112 sends the separate data packets to a USPP thread 122. UsMac thread 112 separately recognizes upstream Bandwidth Request Mac Management Messages (MMMs) and forwards them to a scheduling software application (not shown) for upstream DOCSIS scheduling. UsMac thread 112 also recognizes other upstream MAC management messages and forwards them to a DOCSIS protocol software process for handling.

In step 350, USPP thread 122 performs Source Address Verification for upstream IP packets and any VLAN encapsulation required for DOCSIS L2VPN operation.

In an embodiment, the functionality described above with respect to USPP thread 122 may be implemented, at least partially, in hardware rather than exclusively by software. In such an embodiment, the functionality described herein as being attributed to or performed by USPP thread 122 may be performed by one or more USPP hardware components, which may correspond to a hardware card that accelerates the operation of encrypting upstream packets. As used herein, the term 'USPP component' and 'USPP stage' includes both a software implementation, a hardware implementation, and an implementation involving both hardware and software. While embodiments shall chiefly be described in terms of USPP thread 122 being implemented in software, it shall be understood to those in the art that other embodiments may be employed where USPP thread 122 is implemented partially or wholly by hardware.

In step 260, USPP thread 122 forwards packets directly to the DPDK Ethernet port for the Ethernet trunk interface to a commercial off-the-shelf switch/router (which may be a CRE in an embodiment).

Multiple pairs of UsMac thread 122/USPP thread 122 may be created, in which case an LCCE IP address is advantageously assigned to a single UsMac thread 112 and distributor thread 110 forwards upstream packets to the appropriate UsMac thread 122/USPP thread 122 pair based on the destination LCCE IP address, which avoids duplicating upstream per-CM Source Address Verification information and per-service-flow statistic information between cores, thereby reducing the probability of L1 cache misses. The assignment by embodiments of certain DOCSIS components to a particular instance of a processing stage on a CPU core is unique and represents an inventive leap to the CMTS industry. The usual software industry mechanism for dividing work among multiple CPU cores is with symmetric multiprocessing and load balancing among the cores, with little or no knowledge of the application domain of the software processes. Examples of assignment of DOCSIS components to processing stages include: assigning a DOCSIS service flow to one DSENC stage, assigning a DOCSIS MAC Doman or MAC Domain downstream service group to one TM stage, assigning a DOCSIS downstream channel to one DSMAC stage, assigning a DOCSIS LCCE to one US MAC stage, and assigning a DOSCIS service flow to one USPP stage.

High and Low Priority Rings

During high capacity operation, any thread instance may become too busy to keep up with incoming packets, which may cause congestion and eventual data loss of MBUFs on the rings going into those thread instances. Certain embodiments may employ data rings of varying degrees of priority so that lower priority traffic becomes congested and suffers drops before higher priority rings. Embodiments may employ data rings of any number of degrees of priority, e.g., two degrees may exist so that data rings may only be assigned a 'high' or 'low' priority, or three or more degrees may exist so that any level of granularity may be used to order data rings based on priority.

High priority rings may be advantageously used for certain classes of traffic. For example, in an embodiment, in decreasing order of priority, high priority rings are advantageously used for the following classes of traffic: Downstream DOCSIS maps and UCDs, Upstream Bandwidth Requests, Downstream and Upstream Voice payload, and finally all other DOCSIS Mac Management Messages.

Implementing Hardware

Figure 4:
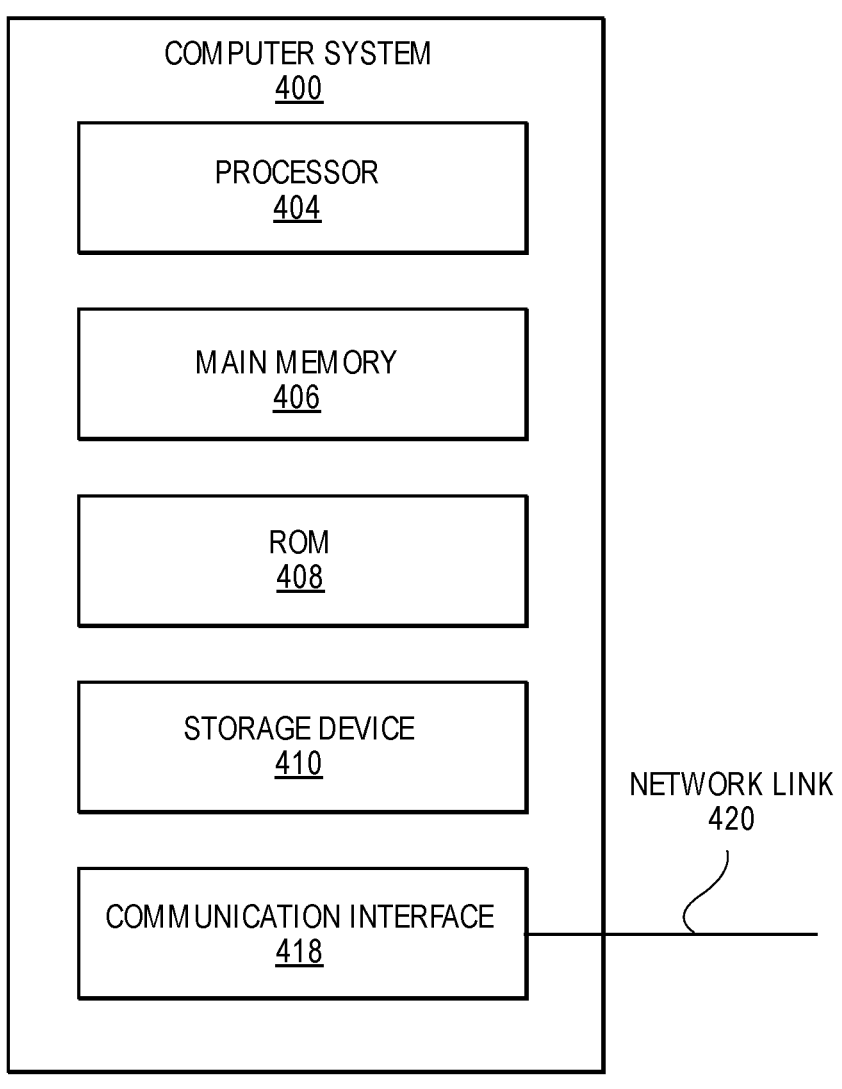
FIG. 4 is a block diagram that illustrates a computer system upon which an embodiment of the invention may be implemented.

In an embodiment, software-based Converged Cable Access Platform (CCAP) environment 12 may execute upon one or more physical machines 10. In an embodiment, each physical machine 10 may correspond to a computer system. FIG. 4 is a block diagram that illustrates a computer system 400 which may be used to implement an embodiment of the invention. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in storing instructions which may be provided to processor 404 for execution. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for performing Converged Cable Access Platform (CCAP) processing, wherein execution of the one or more sequences of instructions by one or more processors causes:

executing a software-based Converged Cable Access Platform (CCAP) environment on one or more physical machines, wherein an execution runtime of said software-based Converged Cable Access Platform (CCAP) environment is performed by a plurality of functional blocks using library Application Program Interfaces (APIs), wherein said software-based Converged Cable Access Platform (CCAP) environment exchanges data packets carrying data and voice traffic to cable subscribers, wherein each of said plurality of functional blocks is implemented in software and performs a specific function supporting said software-based Converged Cable Access Platform (CCAP) environment, wherein said plurality of functional blocks perform packet classification, packet scheduling, and packet replication for said software-based Converged Cable Access Platform environment on said data packets carrying said data and voice traffic exchanged with said cable subscribers; and

maintaining a configuration file for said software-based Converged Cable Access Platform (CCAP) environment which instructs each of said plurality of functional blocks how to operate with respect to one or more Data Over Cable Service Interface Specification (DOCSIS) service groups (SGs) as defined by the DOCSIS telecommunications standard, wherein each of said plurality of functional blocks performs their specific function synchronously, asynchronously, and/or in parallel with each other based on said configuration file, wherein said plurality of functional blocks process downstream data packets by moving said downstream data packets through a sequence of operational stages, wherein each operational stage of said sequence of operational stages is implemented by one or more functional blocks of said plurality of functional blocks, and wherein a particular functional block identifies, from a group of functional blocks implementing a particular operational stage in said sequence, one functional block in said group of functional blocks to which a particular downstream data packet should be forwarded for processing using (a) DOCSIS SG data provided by said configuration file and (b) DOCSIS service flow data associated with said particular downstream data packet.

2. The one or more non-transitory computer-readable storage mediums of claim 1, wherein said one or more Data Over Cable Service Interface Specification (DOCSIS) service groups (SGs) are treated as a logical unit by said configuration file with respect to their association with said each of said plurality of functional blocks.

3. The one or more non-transitory computer-readable storage mediums of claim 1, wherein execution of the one or more sequences of instructions further cause:

adjusting an execution of a particular functional block, of said plurality of functional blocks, to switch from one or more of (a) executing upon a single thread to upon multiple threads, (b) executing upon multiple threads to a single thread, (c) executing upon multiple compute nodes to a single compute node, and (d) executing upon a single compute node to multiple compute nodes.

4. The one or more non-transitory computer-readable storage mediums of claim 1, wherein each of the plurality of functional blocks executes within a separate container.

5. The one or more non-transitory computer-readable storage mediums of claim 1, wherein execution of the one or more sequences of instructions further cause:

instructing a first functional block of the plurality of functional blocks to perform work for a single Data Over Cable Service Interface Specification (DOCSIS) service group (SG); and instructing a second functional block of the plurality of functional blocks to perform work for multiple DOCSIS service groups (SGs).

6. The one or more non-transitory computer-readable storage mediums of claim 1, wherein execution of the one or more sequences of instructions further cause:

dynamically measuring a set of available resources of one or more compute nodes;

in response to determining that said set of available resources is presently below a pre-identified threshold, updating, during runtime, a configuration of said plurality of functional blocks to cause each of said functional blocks to execute on a separate thread of execution; and in response to determining that said set of available resources is presently at or above said pre-identified threshold, updating, during runtime, said configuration of said plurality of functional blocks to cause each of said functional blocks to execute on multiple threads of execution.

7. The one or more non-transitory computer-readable storage mediums of claim 1, wherein execution of the one or more sequences of instructions further cause:

dynamically measuring a set of available resources of one or more compute nodes;

in response to determining that said set of available resources is presently below a pre-identified threshold, updating, during runtime, a configuration of said plurality of functional blocks to cause a first portion of said functional blocks to execute on a separate thread of execution; and in response to determining that said set of available resources is presently at or above said pre-identified threshold, updating, during runtime, said configuration of said plurality of functional blocks to cause a second portion of said functional blocks to execute on multiple threads of execution.

8. The one or more non-transitory computer-readable storage mediums of claim 1, wherein execution of the one or more sequences of instructions further cause:

dynamically changing, during runtime, whether at least one of said plurality of functional blocks executes on a single thread basis or a multiple thread basis based on observed load patterns and availability of compute resources.

9. One or more apparatuses for performing Converged Cable Access Platform (CCAP) processing, comprising:

one or more processors; and one or more non-transitory computer-readable storage mediums storing one or more sequences of instructions, which when executed, cause:

executing a software-based Converged Cable Access Platform (CCAP) environment on one or more physical machines, wherein an execution runtime of said software-based Converged Cable Access Platform (CCAP) environment is performed by a plurality of functional blocks, using library Application Program Interfaces (APIs), wherein said software-based Converged Cable Access Platform CCAP environment exchanges data packets carrying data and voice traffic to cable subscribers, wherein each of said plurality of functional blocks is implemented in software and performs a specific function supporting said software-based Converged Cable Access Platform (CCAP) environment, wherein said plurality of functional blocks perform packet classification, packet scheduling, and packet replication for said software-based Converged Cable Access Platform environment on said data packets carrying said data and voice traffic exchanged with said cable subscribers; and maintaining a configuration file for said software-based Converged Cable Access Platform (CCAP) environment which instructs each of said plurality of functional blocks how to operate with respect to one or more Data Over Cable Service Interface Specification (DOCSIS) service groups (SGs) as defined by the DOCSIS telecommunications standard, wherein each of said plurality of functional blocks performs their specific function synchronously, asynchronously, and/or in parallel with each other based on said configuration file, wherein said plurality of functional blocks process downstream data packets by moving said downstream data packets through a sequence of operational stages, wherein each operational stage of said sequence of operational stages is implemented by one or more functional blocks of said plurality of functional blocks, and wherein a particular functional block identifies, from a group of functional blocks implementing a particular operational stage in said sequence, one functional block in said group of functional blocks to which a particular downstream data packet should be forwarded for processing using (a) DOCSIS SG data provided by said configuration file and (b) DOCSIS service flow data associated with said particular downstream data packet.

10. The one or more apparatuses of claim 9, wherein said one or more Data Over Cable Service Interface Specification (DOCSIS) service groups (SGs) are treated as a logical unit by said configuration file with respect to their association with said each of said plurality of functional blocks.

11. The one or more apparatuses of claim 9, wherein execution of the one or more sequences of instructions further cause:

adjusting an execution of a particular functional block, of said plurality of functional blocks, to switch from one or more of (a) executing upon a single thread to upon multiple threads, (b) executing upon multiple threads to a single thread, (c) executing upon multiple compute nodes to a single compute node, and (d) executing upon a single compute node to multiple compute nodes.

12. The one or more apparatuses of claim 9, wherein each of the plurality of functional blocks executes within a separate container.

13. The one or more apparatuses of claim 9, wherein execution of the one or more sequences of instructions further cause:

instructing a first functional block of the plurality of functional blocks to perform work for a single Data Over Cable Service Interface Specification (DOCSIS) service group (SG); and instructing a second functional block of the plurality of functional blocks to perform work for multiple DOCSIS service groups (SGs).

14. The one or more apparatuses of claim 9, wherein execution of the one or more sequences of instructions further cause:

dynamically measuring a set of available resources of one or more compute nodes;

in response to determining that said set of available resources is presently below a pre-identified threshold, updating, during runtime, a configuration of said plurality of functional blocks to cause each of said functional blocks to execute on a separate thread of execution; and in response to determining that said set of available resources is presently at or above said pre-identified threshold, updating, during runtime, said configuration of said plurality of functional blocks to cause each of said functional blocks to execute on multiple threads of execution.

15. The one or more apparatuses of claim 9, wherein execution of the one or more sequences of instructions further cause:

dynamically measuring a set of available resources of one or more compute nodes;

in response to determining that said set of available resources is presently below a pre-identified threshold, updating, during runtime, a configuration of said plurality of functional blocks to cause a first portion of said functional blocks to execute on a separate thread of execution; and in response to determining that said set of available resources is presently at or above said pre-identified threshold, updating, during runtime, said configuration of said plurality of functional blocks to cause a second portion of said functional blocks to execute on multiple threads of execution.

16. The one or more apparatuses of claim 9, wherein execution of the one or more sequences of instructions further cause:

dynamically changing, during runtime, whether at least one of said plurality of functional blocks executes on a single thread basis or a multiple thread basis based on observed load patterns and availability of compute resources.

17. A method for performing Converged Cable Access Platform (CCAP) processing, comprising:

executing a software-based Converged Cable Access Platform (CCAP) environment on one or more physical machines, wherein an execution runtime of said software-based Converged Cable Access Platform (CCAP) environment is performed by a plurality of functional blocks using library Application Program Interfaces (APIs), wherein said software-based Converged Cable Access Platform CCAP environment exchanges data packets carrying data and voice traffic to cable subscribers, wherein each of said plurality of functional blocks is implemented in software and performs a specific function supporting said software-based Converged Cable Access Platform (CCAP) environment, wherein said plurality of functional blocks perform packet classification, packet scheduling, and packet replication for said software-based Converged Cable Access Platform environment on said data packets carrying said data and voice traffic exchanged with said cable subscribers; and maintaining a configuration file for said software-based Converged Cable Access Platform (CCAP) environment which instructs each of said plurality of functional blocks how to operate with respect to one or more Data Over Cable Service Interface Specification (DOCSIS) service groups (SGs) as defined by the DOCSIS telecommunications standard, wherein each of said plurality of functional blocks performs their specific function synchronously, asynchronously, and/or in parallel with each other based on said configuration file, wherein said plurality of functional blocks process downstream data packets by moving said downstream data packets through a sequence of operational stages, wherein each operational stage of said sequence of operational stages is implemented by one or more functional blocks of said plurality of functional blocks, and wherein a particular functional block identifies, from a group of functional blocks implementing a particular operational stage in said sequence, one functional block in said group of functional blocks to which a particular downstream data packet should be forwarded for processing using (a) DOCSIS SG data provided by said configuration file and (b) DOCSIS service flow data associated with said particular downstream data packet.

18. The method of claim 17, wherein said one or more Data Over Cable Service Interface Specification (DOCSIS) service groups (SGs) are treated as a logical unit by said configuration file with respect to their association with said each of said plurality of functional blocks.

19. The method of claim 17, further comprising:

adjusting an execution of a particular functional block, of said plurality of functional blocks, to switch from one or more of (a) executing upon a single thread to upon multiple threads, (b) executing upon multiple threads to a single thread, (c) executing upon multiple compute nodes to a single compute node, and (d) executing upon a single compute node to multiple compute nodes.

20. The method of claim 17, further comprising:

instructing a first functional block of the plurality of functional blocks to perform work for a single Data Over Cable Service Interface Specification (DOCSIS) service group (SG); and instructing a second functional block of the plurality of functional blocks to perform work for multiple DOCSIS service groups (SGs).

21. The method of claim 17, wherein each of the plurality of functional blocks executes within a separate container.

22. The method of claim 17, further comprising:

dynamically measuring a set of available resources of one or more compute nodes;

in response to determining that said set of available resources is presently below a pre-identified threshold, updating, during runtime, a configuration of said plurality of functional blocks to cause each of said functional blocks to execute on a separate thread of execution; and in response to determining that said set of available resources is presently at or above said pre-identified threshold, updating, during runtime, said configuration of said plurality of functional blocks to cause each of said functional blocks to execute on multiple threads of execution.

23. The method of claim 17, further comprising:

dynamically measuring a set of available resources of one or more compute nodes;

in response to determining that said set of available resources is presently below a pre-identified threshold, updating, during runtime, a configuration of said plurality of functional blocks to cause a first portion of said functional blocks to execute on a separate thread of execution; and in response to determining that said set of available resources is presently at or above said pre-identified threshold, updating, during runtime, said configuration of said plurality of functional blocks to cause a second portion of said functional blocks to execute on multiple threads of execution.

24. The method of claim 17, further comprising:

dynamically changing, during runtime, whether at least one of said plurality of functional blocks executes on a single thread basis or a multiple thread basis based on observed load patterns and availability of compute resources.

* * * * *